(12) United States Patent
Niu et al.

(10) Patent No.: US 11,694,055 B2
(45) Date of Patent: Jul. 4, 2023

(54) OPTICAL TAG BASED INFORMATION APPARATUS INTERACTION METHOD AND SYSTEM

(71) Applicant: BEIJING WHYHOW INFORMATION TECHNOLOGY CO., LTD, Beijing (CN)

(72) Inventors: Xuheng Niu, Beijing (CN); Jun Fang, Xi'an (CN); Jiangliang Li, Beijing (CN)

(73) Assignee: BEIJING WHYHOW INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/089,711

(22) Filed: Nov. 4, 2020

(65) Prior Publication Data

US 2021/0056370 A1 Feb. 25, 2021

Related U.S. Application Data

(63) Continuation of application No. PCT/CN2019/085997, filed on May 8, 2019.

(30) Foreign Application Priority Data

May 9, 2018 (CN) .......................... 201810435183.8

(51) Int. Cl.
*G06K 19/07* (2006.01)
*H04W 4/02* (2018.01)
(Continued)

(52) U.S. Cl.
CPC ......... *G06K 19/0728* (2013.01); *G06F 3/017* (2013.01); *G06K 7/10861* (2013.01); *G06T 7/70* (2017.01); *H04W 4/023* (2013.01)

(58) Field of Classification Search
CPC ............... G06K 19/0728; G06K 19/06; G06K 7/10861; G06K 7/10; G06T 7/70;
(Continued)

(56) References Cited

U.S. PATENT DOCUMENTS 10,841,174 B1 * 11/2020 Ely .................... G02B 27/0172
2011/0204134 A1 8/2011 Crackel et al.
(Continued)

FOREIGN PATENT DOCUMENTS

CN 105393260 A 3/2016
CN 105718840 A 6/2016
(Continued)

OTHER PUBLICATIONS

Steinberg et al., "Radio-frequency tag with optoelectronic interface for distributed wireless chemical and biological sensor applications" (Year: 2009).*

(Continued)

*Primary Examiner* — Thien T Mai
(74) *Attorney, Agent, or Firm* — Bayes PLLC

(57) ABSTRACT

The present disclosure provides an optical tag-based information apparatus interaction method and system. The method includes: using a terminal device to perform image acquisition on an optical tag at a relative fixed position to an information apparatus so as to determine a position and an attitude of the terminal device relative to the optical tag; determining, in conjunction with a predetermined position of each information apparatus relative to the optical tag, the position of the terminal device relative to each information apparatus; acquiring an imaging position of each information apparatus on a display screen of the terminal device, and displaying an interactive interface of each information apparatus at the imaging position thereof on the display screen, such that an interactive operation can be performed on each
(Continued)

information apparatus. The disclosure allows a user to control an information apparatus in a field of view anytime and anywhere, and interact with the device as What You See Is What You Get (WYSIWYG).

18 Claims, 3 Drawing Sheets

(51) Int. Cl.
  *G06T 7/70* (2017.01)
  *G06F 3/01* (2006.01)
  *G06K 7/10* (2006.01)

(58) Field of Classification Search
  CPC ............... G06T 1/0007; G06T 15/50; G06T 2207/10152; G06F 3/017; G06F 3/0304; H04W 4/023; H04W 4/021
  See application file for complete search history.

(56) References Cited

U.S. PATENT DOCUMENTS

| | | | |
|---|---|---|---|
| 2014/0186026 A1* | 7/2014 | Oshima | H04B 10/116 398/118 |
| 2015/0177721 A1 | 6/2015 | Hauville et al. | |
| 2017/0091607 A1 | 3/2017 | Emeis et al. | |
| 2018/0091221 A1* | 3/2018 | Bitra | G01S 5/163 |
| 2021/0203994 A1* | 7/2021 | Pan | H04N 19/136 |

FOREIGN PATENT DOCUMENTS

| | | | |
|---|---|---|---|
| CN | 105740936 A | | 7/2016 |
| CN | 106339488 A | | 1/2017 |
| CN | 106408667 A | | 2/2017 |
| CN | 106446737 A | | 2/2017 |
| CN | 106446883 A | | 2/2017 |
| CN | 107703872 A | | 2/2018 |
| CN | 107734449 A | | 2/2018 |
| CN | 107784414 A | | 3/2018 |
| JP | 3904036 B2 | * | 4/2007 |
| JP | 2013-205920 A | | 10/2013 |
| JP | 2017-143553 A | | 8/2017 |
| TW | I606402 B | | 11/2017 |

OTHER PUBLICATIONS

Griggs et al., "Dynamic optical tags" (Year: 2004).*
Search Report issued in related Taiwan Application No. 108116063, dated Jan. 21, 2020, 2 pages.
Search Report issued in related Chinese Application No. 201810435183.8, dated Aug. 25, 2020, 3 pages.
International Search Report issued in corresponding International Application No. PCT/CN2019/085997, dated Jul. 26, 2019, 4 pages.
Extended European Search Report issued in corresponding European Application No. EP19799577.2, completed on Dec. 15, 2021, 9 pages.
Notification of Reasons for Refusal issued in corresponding Japanese Application No. 2021-512990, dated Jan. 25, 2022, 4 pages.
Office action issued in corresponding Korean Application No. 10-2020-7035360, dated Jul. 21, 2022, 5 pages.
Notice of Final Rejection issued in corresponding Korean Application No. 10-2020-7035360, dated Jan. 5, 2023, 7 pages.

* cited by examiner

OPTICAL TAG BASED INFORMATION APPARATUS INTERACTION METHOD AND SYSTEM

CROSS-REFERENCE TO RELATED APPLICATIONS

The present application is a by-pass continuation application of PCT International Application No. PCT/CN2019/085997 filed May 8, 2019, which claims priority to Chinese Patent Application No. 201810435183.8 filed on May 9, 2018, both of which are hereby incorporated by reference in their entireties.

TECHNICAL FIELD

The present disclosure relates to the fields of optical information technologies and position services, and in particular, to a method and a system for performing interaction with apparatus by utilizing an optical tag. Herein, the optical tag is also referred to as an optical communication device.

BACKGROUND

With the continuous development of mobile Internet, Internet of Things technology, big data and other technologies, the smart home industry has ushered in a rapid development, with the emergence of a lot of information household apparatuses equipped with digital, networking, intelligent functions. The information household apparatuses may be connected to each other, and may also be interactively controlled over a network. With the popularity of smart portable devices such as mobile phones, increasingly more smart home systems use the mobile phones to help users control household apparatuses. In this way, a user can control household electrical apparatuses over a network anytime and anywhere as long as the user's mobile phone can be connected to the network. However, when there are many electrical apparatuses, the user needs to browse and make continuous choices on the mobile phone. Such tedious operations are easy to inspire rejection in the user.

SUMMARY

In view of the above problems, the present disclosure provides a new method and system for interaction with information apparatus by using an optical tag, which enables a user to control an apparatus in a field of view anytime and anywhere and interacts with the apparatus as What You See Is What You Get (WYSIWYG).

The objective of the present disclosure is achieved through the following technical schemes:

In one aspect, the present disclosure provides a method for interaction with information apparatus by using an optical tag, the method including the following steps:

S1) determining, by performing image acquisition on an optical tag at a fixed position relative to information apparatus through a terminal device carried by a user, an initial position and attitude of the terminal device relative to the optical tag;

S2) determining a relative position between the terminal device and each information apparatus based on the determined position of the terminal device and a pre-determined position of the information apparatus relative to the optical tag;

S3) calculating an imaging position of each information apparatus on a display screen of the terminal device according to the determined attitude of the terminal device and the relative position between the terminal device and the information apparatus; and S4) presenting an interactive interface of each information apparatus at the respective imaging position on the display screen, for interacting with the respective information apparatus.

The method may further include: adjusting the imaging position of each information apparatus on the display screen of the terminal device in response to a change in the position and/or attitude of the terminal device.

The method may further include:

identifying the user's operation on the interactive interface of the information apparatus; and converting the identified operation into a corresponding operation instruction, and sending the operation instruction to the information apparatus over a network.

In the method, the user's operation on the interactive interface of the information apparatus may include at least one of the following: screen input, keyboard input, voice input or gesture input.

In another aspect, the present disclosure further provides a system for interaction with information apparatus by using an optical tag, including one or more information apparatuses, an optical tag at a fixed position relative to the information apparatus, a server for storing information related to the information apparatus and the optical tag, and a terminal device equipped with an imaging means.

The terminal device may be configured to:

perform image acquisition on an optical tag at a fixed location relative to information apparatus to be accessed, to determine an initial position and attitude of the terminal device relative to the optical tag;

determine a relative position between the terminal device and each information apparatus based on the determined position of the terminal device and a pre-determined position of the information apparatus relative to the optical tag acquired from the server;

calculate an imaging position of each information apparatus on a display screen of the terminal device according to the determined attitude of the terminal device and the relative position between the terminal device and the information apparatus; and present an interactive interface of each information apparatus at the respective imaging position on the display screen, for interacting with the respective information apparatus.

In the system, the terminal device may be further configured to: adjust the imaging position of each information apparatus on the display screen of the terminal device in response to a change in the position and/or attitude of the terminal device.

In the system, the terminal device may be further configured to:

identify the user's operation on the interactive interface of the information apparatus; and convert the identified operation into a corresponding operation instruction, and send the operation instruction to the information apparatus over a network.

In the system, the user's operation on the interactive interface of the information apparatus may include at least one of the following: screen input, keyboard input, voice input or gesture input.

The present disclosure further relates to a computing device including a processor, and a memory storing a computer program which, when executed by the processor, implements the method described above.

The present disclosure further relates to a storage medium storing a computer program which, when executed, implements the method described above.

BRIEF DESCRIPTION OF THE DRAWINGS

Embodiments of the present disclosure are further described below with reference to the accompanying drawings, in which.

DETAILED DESCRIPTION

Figure 1:
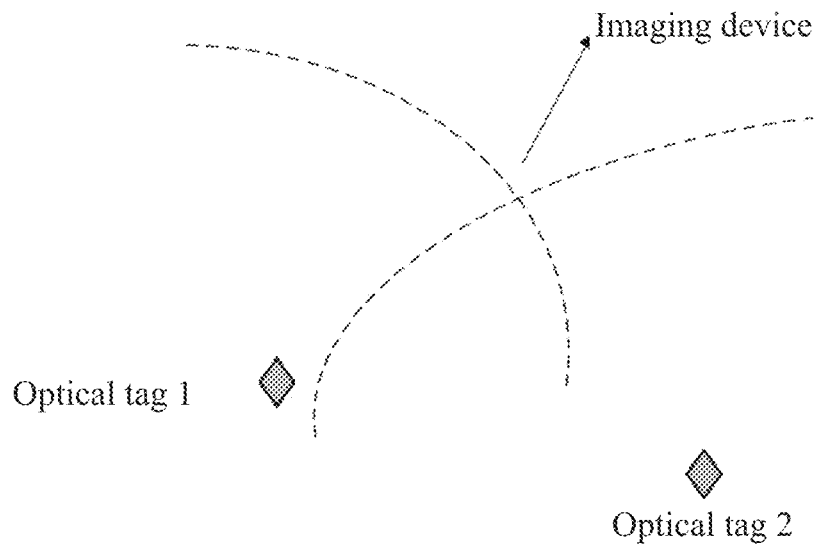
FIG. 1 is a schematic diagram of a triangulation location method, according to an embodiment of the present disclosure.

In order to make the objectives, technical schemes and advantages of the present disclosure much clearer, the present disclosure is described in further detail below with reference to the accompanying drawings and specific embodiments. It should be understood that the specific embodiments described here are intended only to interpret the present disclosure and not to limit the present disclosure.

Bar codes and QR codes have been widely used to encode information. When the bar codes and the QR codes are scanned with a specific device or software, corresponding information may be identified. However, the distance to identify bar codes and the QR codes are very limited. For example, for the QR codes, when they are scanned with a camera of a mobile phone, the mobile phone generally has to be placed at a relatively close distance, which is usually only about 15 times the width of the QR codes. Therefore, for long-distance identification (e.g., at a distance equivalent to 200 times the width of the QR code), bar codes and QR codes usually cannot be implemented, or it is needed to customize very large bar codes and QR codes, but this will bring about an increase in cost, and in many cases is impossible due to various other restrictions.

Optical tags transmit information by emitting different lights, which have the advantages of long distance, loose visible light requirements, strong directivity and localization. Moreover, the information transmitted by the optical tags may change rapidly over time, thus providing greater information capacity (for example, the optical communication device described in Chinese Patent Publication CN104168060A and CN105740936A). Compared with the traditional QR codes, the optical tags have stronger capability of information interaction, which can provide great convenience for users and merchants.

In the embodiments of the present disclosure, the optical tag may be any optical communication device capable of emitting different lights to transmit different information. In one embodiment, the optical tag may include at least one light source and a controller. The controller is configured to control different lights emitted by the light source to transmit different information. For example, the controller may cause the light source to emit different lights by changing an attribute of the light emitted by the light source. The attribute of the light may be any attribute that an optical imaging device (such as a CMOS imaging device) can perceive, for example, intensity, color, wavelength and other attributes of the light that can be perceived by human eyes, or other attributes that cannot be perceived by human eyes, such as intensity, color or wavelength change of an electromagnetic wave outside a visible range of human eyes, or any combination of the above attributes. Therefore, a change in the attributes of the light may be a change in a single attribute or a change in a combination of two or more attributes. When the intensity of the light is selected as an attribute, this may be achieved simply by turning on or turning off a light source. Hereinafter, the attribute of the light is changed by turning on or turning off a light source for the sake of simplicity. However, it is contemplated that other manners for changing the attribute of the light are also possible.

Various forms of light sources may be used in the optical tag provided that one of the attributes thereof that can be perceived by the optical imaging device are changed at different frequencies. The light source may include various common optical devices, such as a light guide plate, a light softening plate, a diffuser or the like. For example, the light source may be an LED, an array of LED lamps, a display screen or a part thereof, or even an irradiated region of light (such as an irradiated region of light on a wall). The light source may be in various shapes, such as round, square, rectangular, striped, or L-shaped.

In one embodiment, the controller of the optical tag may control attributes of light emitted by each light source in order to transmit information. For example, "0" or "1" of binary digital information can be represented by controlling the turn-on and turn-off of each light source, so that a plurality of light sources in the optical tag can be used to represent a sequence of binary digital information. Each light source can be used to represent not only a binary number, but also data in ternary or larger. For example, each light source may represent data in ternary or larger by choosing the intensity of light emitted by the light source from three or more levels, or choosing the color of the light emitted by the light source from three or more colors, or even by a combination of intensity and color. Therefore, compared with the traditional QR codes, the optical tag of the present disclosure can significantly improve the data coding density.

In another embodiment, the controller of the optical tag may control the light source to change, at a certain frequency, the attributes of the light emitted by it. Therefore, the optical tag of the present disclosure may represent different data information at different times, for example, different binary digital information sequences. Thus, when the optical imaging device is used to continuously photograph the optical tag of the present disclosure (for example, at a rate of 30 frames per second), each frame of image may be used to represent a set of information sequences, which can further significantly improve the data coding density compared with the traditional static QR codes.

In the embodiments of the present disclosure, an optical imaging device or image acquisition device common in the art can be used to image the optical tag, and information transmitted from each frame of image can be determined, such as a binary data 1 or data 0 information sequence, so as to achieve information transmission from the optical tag to the optical imaging device. The optical imaging device or image acquisition device may include an image acquisition element, a processor, and a memory, etc. The optical imaging device or image acquisition device may be, for example, a mobile terminal with a shooting function, including mobile phones, tablet computers, smart glasses, etc., which may include an image acquisition means and an image processing module. A user finds an optical tag with naked eyes within a visual range of the optical tag, and causes a mobile terminal imaging sensor to face the optical tag to scan the optical tag and perform information capturing and interpretation processing. When the controller of the optical tag controls the light source to change, at a certain frequency, an attribute of light emitted by it, an image acquisition frequency of the mobile terminal may be set to be more than or equal to 2 times an attribute transformation frequency of the light source. A process of identification and decoding may be completed by decoding collected image frames. In one embodiment, in order to avoid repetition and omission of the image frames, the information transmitted by the optical tag may include a sequence number, a check bit, a timestamp, etc. A start frame or an end frame, or both, can be provided in the plurality of image frames as needed to indicate a start or end position of a full cycle of the plurality of image frames. The start frame or the end frame may be set to display a special data combination, such as all 0 or all 1, or any special combination that may not be the same as information actually possibly displayed.

Taking a CMOS imaging device as an example, when continuous multi-frame images of a light source are shot through the CMOS imaging device, the controller may perform control such that a switching time interval between operating modes of the light source is equal to a time length of a complete frame imaging of the CMOS imaging device, thus achieving frame synchronization between the light source and the imaging device. Assuming that each light source transmits 1-bit information per frame, each light source can transmit 30-bit information per second for a shooting speed of 30 frames per second, and the coding space reaches $2^{30}$. The information may include, for example, a start frame tag (frame header), an ID of the optical tag, a password, a verification code, URL information, address information, timestamp, or different combinations thereof, and so on. A sequence relation of the above information can be set according to a structured method to form a data packet structure. Each time a complete data packet structure is received, it is regarded as a complete set of data (a data packet), and then data thereof can be read and checked for analysis. Table 1 shows an example packet structure according to an embodiment of the present disclosure:

TABLE 1

| Frame header | Attribute field (optional) | Data field | Check bit | Frame end |
| --- | --- | --- | --- | --- |

Compared with the traditional QR codes, the optical tag transmits information by emitting different lights, which has the advantages of long distance, loose visible light requirements, strong directivity and localization. Moreover, the information transmitted by the optical tag may change rapidly over time, thus providing greater information capacity. Therefore, the optical tag has stronger capability of information interaction, which provides great convenience for users and merchants. Each optical tag is assigned a unique identifier (ID) in order to provide corresponding services to the users and the merchants based on the optical tag. The identifier is used to uniquely identify or identify the optical tag by a manufacturer, manager, user, etc., of the optical tag. Generally, the optical tag may publish its identifier, and the user obtains the information (such as the identifier) transmitted by the optical tag by using, for example, an image acquisition device or imaging means built into a mobile phone, so as to access the services provided based on the optical tag.

In the embodiments of the present disclosure, accurate positioning of an imaging device scanning an optical tag (also referred to as reverse positioning or relative positioning) may also be performed based on the optical tag. For example, geographic position information of the optical tag may be pre-registered on, for example, a server. The optical tag may transmit its identification information (such as ID information) during operation, and the imaging device may obtain the ID information by scanning the optical tag. After the imaging device obtains the ID information of the optical tag, the ID information is used to query the server, and a geographic position corresponding to the optical tag can be obtained, so as to perform reverse positioning to determine a specific position of the imaging device. Optionally, other related information of the optical tag, for example, physical size information, physical shape information, and/or orientation information, may also be pre-registered on the server. In one embodiment, the optical tag may have a uniform or default physical size or shape and a user device may be aware of the physical size or shape.

A variety of possible reverse positioning methods can be used to determine a relative position relationship between the user (in fact, the user's imaging device) and the optical tag. For example, the relative position relationship between the imaging device and any optical tag may be determined by determining a relative distance between the imaging device and the optical tag (for example, through an imaging size of the optical tag, or through any application with the ranging function on the mobile phone), and through triangulation location using two or more optical tags. The relative position relationship between the imaging device and the optical tag may also be determined by determining a relative distance between the imaging device and the optical tag and by analyzing perspective deformation of the optical tag imaging on the imaging device. The physical size information and/or the orientation information of the optical tag may be further used to determine the relative position relationship between the imaging device and the optical tag. The physical size information and/or the orientation information can be stored on the server associatively with the identification information for the optical tag.

For example, in one embodiment, at least two optical tags may be used for positioning. The following steps can be performed for each optical tag:

At Step 1, ID information of an optical tag is captured using an imaging device.

At Step 2, physical size information and geographic position information of the optical tag are obtained by query based on the ID information.

At Step 3, the optical tag is photographed by using a default focal length of the imaging device to obtain an image of the optical tag. Since the default focal length of the imaging device is used, the image of the optical tag taken may be blurred.

At Step 4, the focal length of the imaging device is adjusted and optimized to obtain a clear image of the optical tag. For example, based on a default focal length, the focal length is increased at first. If the image of the optical tag becomes clear, the focal length is continuously increased. If the image of the optical tag becomes fuzzy, the focal length is adjusted in the opposite direction, that is, the focal length is reduced; and vice versa. In the process of adjustment of the focal length, in order to determine the clarity of the image of the optical tag, texture features of the image of the optical tag image may be extracted. A clearer image of the optical tag indicates simpler corresponding texture information and smaller texture density. Therefore, an optimal focal length parameter may be determined according to the texture density of the image of the optical tag. When smaller texture density cannot be obtained after multiple iterations, an image with the minimum texture density may be considered as a clear image, and a focal length parameter corresponding to the obtained minimum texture density may be taken as the optimal focal length parameter.

At Step 5, a clear image of the optical tag is taken based on the optimal focal length parameter, and then a relative distance between the imaging device and the optical tag is calculated according to the size of the clear image of the optical tag, the physical size of the optical tag, and the optimal focal length by using a simple lens object-image formula and an object-image relation.

After a relative distance between the imaging device and each of the at least two optical tags is obtained, specific position information of the imaging device can be determined by using a triangulation location method, that is, specific coordinates of the imaging device in a physical world coordinate system. FIG. 1 is a schematic diagram of a triangulation location method, in which two optical tags (an optical tag 1 and an optical tag 2) are used for triangulation location.

In addition, when the two optical tags are used for triangulation location, two candidate positions may generally be obtained. In this case, it may be necessary to choose from the two candidate positions. In one implementation mode, one candidate position may be selected in combination with positioning information (for example, GPS information) of the imaging device (for example, the mobile phone). For example, one candidate position closer to the GPS information may be selected. In another implementation mode, orientation information of each optical tag may be further taken into account. The orientation information actually defines a region where the optical tag can be observed. Therefore, one candidate position may be selected based on the orientation information. The orientation information of the optical tag may also be stored in a server, and may be obtained by query according to ID information of the optical tag. Two optical tags are taken as an example for description in the above embodiment; however, it is contemplated that the triangulation location-based method is also applicable to cases of three or more optical tags. In fact, using three or more optical tags may allow for more precise positioning, and a plurality of candidate points may not occur generally.

In another embodiment, the following reverse positioning method may also be used. The embodiment does not require the use of at least two optical tags, but may perform reverse positioning by using one optical tag. The method in this embodiment includes the following steps:

At Step 1, ID information of an optical tag is taken by using an image device.

At Step 2, geographic position information of the optical tag and relevant information of a plurality of points thereon are obtained by query based on the ID information. The relevant information is, for example, position information of the points on the optical tag and their coordinate information.

At Step 3, the optical tag is photographed by using a default focal length of the imaging device to obtain an image of the optical tag. For example, as described above, an optimal focal length parameter may be determined according to texture density of the image of the optical tag. When smaller texture density cannot be obtained after multiple iterations, an image with the minimum texture density may be considered as a clear image, and a focal length parameter corresponding to the obtained minimum texture density may be taken as the optimal focal length parameter.

Figure 2:
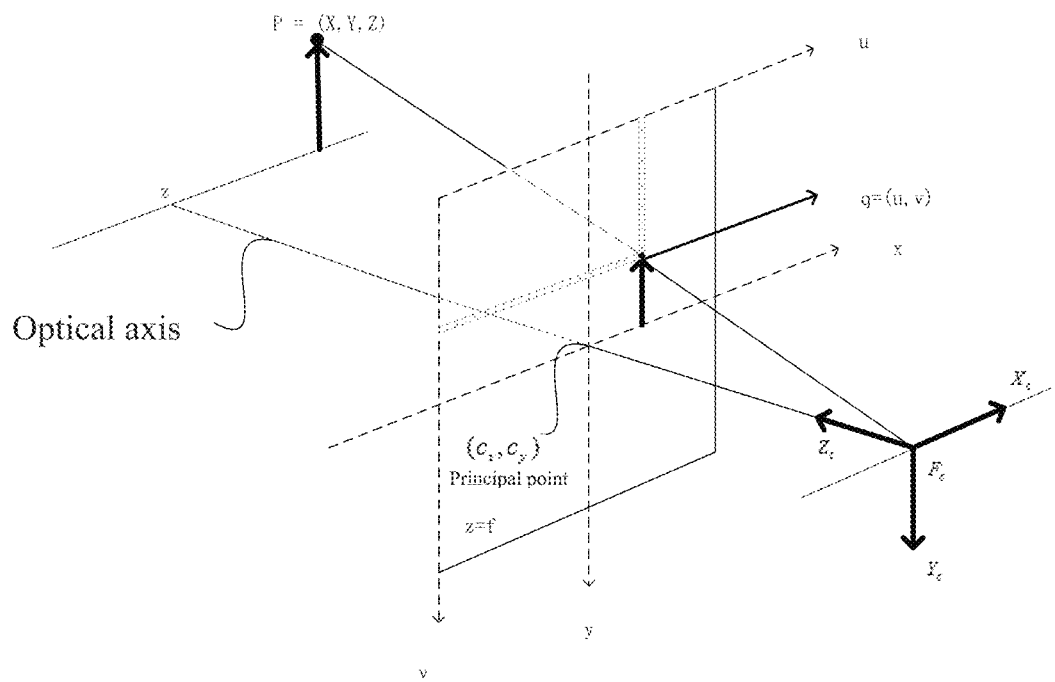
FIG. 2 is a schematic diagram of an imaging process performed by an imaging device during image acquisition of an optical tag, according to an embodiment of the present disclosure.

At Step 4, a clear image of the optical tag is taken based on the optimal focal length parameter, and reverse positioning introduced as below is implemented:

Referring to FIG. 2, FIG. 2 is a schematic diagram of an imaging process of an optical tag performed by an imaging device. An object coordinate system (X, Y, Z) is established with the center of mass of the optical tag as the origin, and an image coordinate system (x, y, z) is established with a position $F_c$ of the imaging device as the origin. The object coordinate system is also referred to as a physical world coordinate system, and the image coordinate system is also referred to as a camera coordinate system. In addition, a point in an upper left corner of the image of the optical tag collected by the imaging device is taken as the origin of coordinates, and a two-dimensional coordinate system (u, v) is established in an image plane of the optical tag, which is referred to as an image plane coordinate system. An intersection point of the image plane and an optical axis (namely, Z axis) is a principal point, and $(c_x, c_y)$ are coordinates of the principal point in the image plane coordinate system. Coordinates of any point P on the optical tag in the object coordinate system are (X, Y, Z), an image point corresponding thereto is q, its coordinates in the image coordinate system are (x, y, z), and its coordinates in the image plane coordinate system are (u, v). In the process of imaging, the image coordinate system not only has a change in displacement but also has angular rotation relative to the object coordinate system. A relationship between the object coordinate system (X, Y, Z) and the image coordinate system (x, y, z) may be expressed as:

$$\begin{bmatrix} x \\ y \\ z \end{bmatrix} = R \begin{bmatrix} X \\ Y \\ Z \end{bmatrix} + t \qquad (1)$$

Variables x'=x/z and y'=y/z are defined;
then, coordinates in the image plane coordinate system are:

$$u=f_x*x'+c_x \text{ and } v=f_y*y'+c_y \qquad (2);$$

where $f_x$ and $f_y$ are focal lengths of the imaging device in x-axis and y-axis directions respectively, $c_x$ and $c_y$ are coordinates of the principal point in the image plane coordinate system, and $f_x$, $f_y$, $c_x$ and $c_y$ are all internal parameters of the imaging device, which can be measured in advance. A rotation matrix R and a displacement vector t represent attitude information (i.e. attitude of the imaging device relative to the optical tag, namely, bias of the central axis of the imaging device from the optical tag, also referred to as orientation of the imaging device relative to the optical tag, for example, R=0 when the imaging device directly faces the optical tag) and displacement information (i.e. displacement between the imaging device and the optical tag) of the object coordinate system relative to the image coordinate system, respectively. In a three-dimensional space, rotation may be divided into two-dimensional rotation about respective axes. If it rotates at angles ψ, φ and θ sequentially about x, y and z axes, a total rotation matrix R is the product of three matrixes $R_x(\psi)$, $R_y(\varphi)$ and $R_z(\theta)$, that is, $R=R_x(\psi)*R_y(\varphi)*R_z(\theta)$, where, $$R_x(\psi) = \begin{bmatrix} 1 & 0 & 0 \\ 0 & \cos\psi & \sin\psi \\ 0 & -\sin\psi & \cos\psi \end{bmatrix}$$

$$R_y(\varphi) = \begin{bmatrix} \cos\varphi & 0 & -\sin\varphi \\ 0 & 1 & 0 \\ \sin\varphi & 0 & \cos\varphi \end{bmatrix}$$

$$R_z(\theta) = \begin{bmatrix} \cos\theta & \sin\theta & 0 \\ -\sin\theta & \cos\theta & 0 \\ 0 & 0 & 1 \end{bmatrix}$$

For the sake of simplicity, calculation is not expanded herein because it is well known in the art, and the rotation matrix is only simply written in the following form:

$$R = \begin{bmatrix} r_{11} & r_{12} & r_{13} \\ r_{21} & r_{22} & r_{23} \\ r_{31} & r_{32} & r_{33} \end{bmatrix};$$

the displacement vector t may be simply given in the following form:

$$t = \begin{bmatrix} t_1 \\ t_2 \\ t_3 \end{bmatrix},$$

and then the following relation is obtained:

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}. \quad (3)$$

where s is an object-image transformation factor, which is equal to a ratio of the size of the image plane to the resolution of the imaging device, and is also known.

Figure 3:
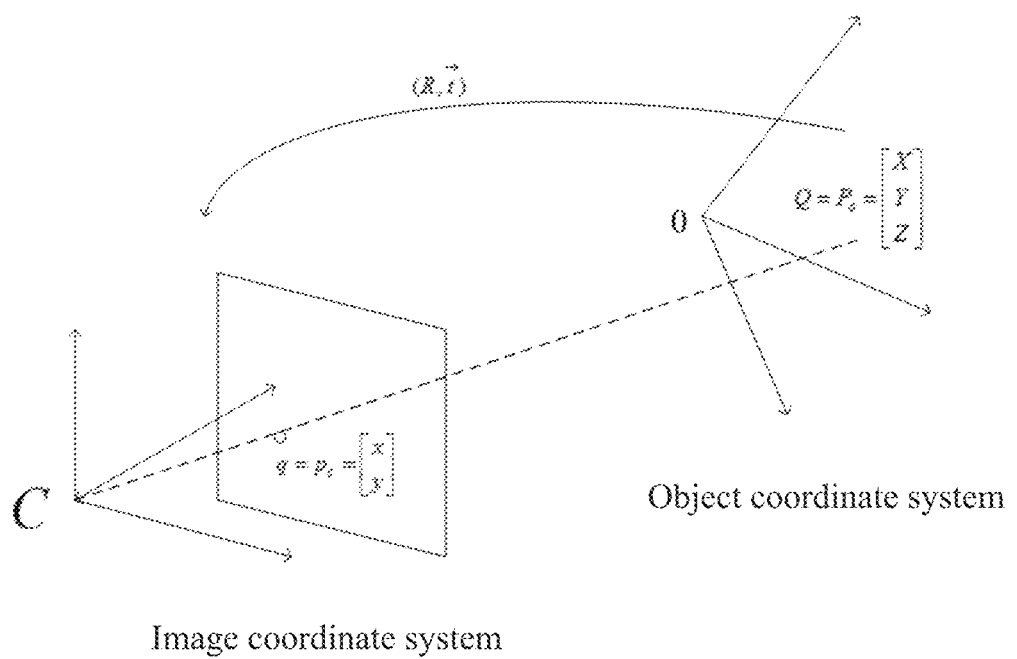
FIG. 3 is a schematic diagram of a simplified relationship between an object coordinate system and an image coordinate system, according to an embodiment of the present disclosure.

According to the relevant information (e.g. position information of the points on the optical tag) of the plurality of points (e.g. at least four points A, B, C and D) on the optical tag obtained in Step 2, image points, for example, A', B', C' and D', of these points in the image of the optical tag are determined. The four points A, B, C and D may be, for example, on left and rights sides of the optical tag respectively, or four separate point light sources located in four corners of the optical tag, and so on. Coordinate information $(X_A, Y_A, Z_A)$, $(X_B, Y_B, Z_B)$, $(X_C, Y_C, Z_C)$ and $(X_D, Y_D, Z_D)$ of the four points are also obtained in Step 2. The rotation matrix R and the displacement vector t are solved by measuring coordinates $(u_{A'}, v_{A'})$, $(u_{B'}, v_{B'})$, $(u_{C'}, v_{C'})$ and $(u_{D'}, v_{D'})$ of the corresponding four image points A', B', C' and D' in the image plane coordinate system and substituting them into the relation (3), and then the relationship between the object coordinate system (X, Y, Z) and the image coordinate system (x, y, z) is obtained. Based on the relation, attitude information and displacement information of the imaging device relative to the imaging device may be obtained, so as to achieve positioning of the imaging device. FIG. 3 shows a simplified relationship between an object coordinate system and an image coordinate system. Actual specific position and attitude of the imaging device may be calculated by means of the rotation matrix R and the displacement vector t based on geographic position information of the optical tag obtained in Step 2. The specific position of the imaging device is determined through the displacement vector t, and the attitude of the imaging device relative to the optical tag is determined through the rotation matrix R.

In one embodiment of the present disclosure, a system for interaction with information apparatus by using an optical tag is further provided. An information apparatus in the system refers to any computing apparatus that can be interactively controlled over a network, including, but not limited to, information household apparatus or home apparatus. Each information apparatus may be associated with one or more optical tags, and each optical tag may be associated with one or more information apparatus. The optical tag may be provided on the information apparatus or may be located in a fixed position relative to the information apparatus. The physical position of the optical tag and the position of each information apparatus relative to the optical tag are pre-determined. Information related to the optical tag and its associated information apparatus may be saved on the server for query. The information related to the optical tag may include, for example, information such as ID information of the optical tag, physical world coordinates, a physical size and orientation of the optical tag, identifiers of information apparatus associated with the optical tag, position information on the optical tag of a plurality of points on the optical tag and object coordinates thereof. The information related to the information apparatus may include, for example, information such as identifiers of the information apparatus, coordinates of the information apparatus in an object coordinate system established by taking the center of mass of the optical tag associated therewith as the origin, relative position information of the information apparatus and the optical tag associated therewith, an operation interface of the information apparatus, description information, size and orientation of the information apparatus and so on.

When a user wants to interact with an information apparatus in his/her field of view, he/she may use an imaging means of a terminal device (such as a mobile phone) carried along to perform image acquisition on an optical tag associated with the information apparatus to obtain ID information of the optical tag. Then, the terminal device may obtain information related to the information apparatus associated with the optical tag from the server based on the ID information of the optical tag, and may present an interactive interface of the information apparatus in a position where the information apparatus is located on a display screen of the terminal device. In this way, the user may perform a relevant interactive control operation on the information apparatus through an interaction interface superimposed on or near the information apparatus. In some embodiments, before the interactive interface of the information apparatus is presented in the position where the information apparatus is currently displayed on the screen of the terminal device, it is possible to first judge whether any information apparatus associated with the optical tag appears on the display screen of the terminal device and further determine an imaging position of the information apparatus on the display screen when the judgment result is yes, for example, two-dimensional image plane coordinates thereof during imaging on the screen are determined.

In order to achieve the above objectives, the reverse positioning method mentioned above may be used to determine an initial relative position relationship between the terminal device carried by the user and the optical tag, so as to determine an initial position and initial orientation of the user's terminal device. Further, since the physical position of the optical tag and the position of each information apparatus relative to the optical tag have been calibrated in advance, the initial relative position relationship between the user's terminal device and each information apparatus can be determined based on the initial position of the terminal device and pre-stored calibration information. Based on the initial relative position relationship between the user's terminal device and each information apparatus and the initial orientation of the terminal device, it may be determined whether any information apparatus currently associated with the optical tag may appear on the display screen of the terminal device, and the imaging position of the information apparatus on the display screen is further determined when the judgment result is yes. If the information apparatus that the user wants to control does not appear on the current display screen, the user may move the terminal device from the initial position to enable the information apparatus to appear on the display screen. For example, the user may translate or rotate the terminal device so that its camera finally faces the information apparatus. When the terminal device moves from the initial position, the change in the position and attitude of the terminal device may be detected in various existing manners (for example, monitored by an accelerometer, gyroscope and other sensors built in the terminal device), so as to determine position information and orientation information of the terminal device after the movement. Based on the position information and the orientation information, it is possible to determine which information apparatus may currently appear on the display screen of the terminal device and their respective presentation positions. Then, interactive interfaces of these information apparatus can be superimposed respectively on the imaging position of the respective information apparatus on the display screen to implement WYSIWYG interactive operations for the information apparatus.

In one embodiment, as introduced above, when image acquisition is performed on the optical tag by using an imaging device, a certain transformation relation (e.g. formula (1)) exists between a physical object coordinate system (X, Y, Z) established by taking the center of mass of the optical tag as the origin and a camera coordinate system (x, y, z) established by taking the position of the imaging device as the origin, which may be described with a rotation matrix R and a displacement vector t. A certain transformation relation (e.g. formula (2)) also exists between the camera coordinate system and a two-dimensional image plane coordinate system (u, v) by taking a point in an upper left corner of the image of the optical tag acquired on a camera screen as the coordinate origin, which is determined by internal parameters of the imaging device. Thus, after the rotation matrix R, the displacement vector t and the internal parameters of the imaging device are determined, a transformation relation (e.g. formula (3)) between physical world coordinates and image plane coordinates may also be determined accordingly. The transformation relation is also referred to as a projection relationship, and may be used to determine a projection position in the imaging plane for an actual object in a certain position of the physical world coordinate system.

As described above in combination with the reverse positioning method and the formulas (1)-(3), in the process of determining the specific position and orientation of the imaging device relative to the optical tag according to the image of the optical tag acquired by the imaging means and the information related to the optical tag acquired from the server, the rotation matrix R, the displacement vector t and the internal parameters of the imaging device in the formula (3) have been determined, and thus image plane coordinates of each information apparatus can be determined according to the formula. Since the physical position of the optical tag and the relative positions between the optical tag and the information apparatus are preset, object coordinates of each information apparatus in the physical world coordinate system can be determined according to the relative positions between the optical tag and the information apparatus, image plane coordinates of the information apparatus in the imaging plane can be obtained by substituting the object coordinates into the formula (3), and then an interactive interface of the information apparatus may be presented on the screen of the terminal device based on the image plane coordinates of the information apparatus for use by the user. In another embodiment, an icon of the information apparatus may also be superimposed on the screen of the terminal device for selection by the user. When the user clicks the icon to select a to-be-operated information apparatus, an interactive interface of the information apparatus is presented on the screen of the terminal device for the user to operate and control the information apparatus. If the icons are obscured by each other, the front icon may be made semi-transparent, or a numeric prompt near the foremost icon is used to indicate that a plurality of icons overlap in the position.

In the system, with the movement of the terminal device carried by the user, the imaging position of the terminal device in the physical world changes relative to the position and orientation of the optical tag and the information apparatus, and the position of the information apparatus appearing on the imaging plane of the terminal device may also change. Therefore, it is necessary to detect the position and attitude of the terminal device in real time to timely adjust the rotation matrix R and the displacement vector t to ensure acquisition of accurate image plane coordinates of the information apparatus. The terminal device may monitor changes in its own position and attitude in a variety of manners. For example, the terminal device may compare an image currently captured by the imaging means with a previous image by taking the optical tag as a reference point and identify differences in the images, so as to form feature points, and the feature points are used to calculate changes in the its own position and attitude. For another example, a terminal device such as a mobile phone can estimate changes in position and orientation of its camera in the real world over time according to values measured by a built-in inertial measurement sensor such as an accelerometer or a gyroscope. Then, the rotation matrix R and the displacement vector t are adjusted based on the current position and orientation of the terminal device, and the current image plane coordinates of the information apparatus are re-acquired to present a relevant icon or interface on the screen.

After the user selects the information apparatus that needs to be operated, he/she may interact with the information apparatus in a variety of manners. For example, the user may configure and operate the information apparatus through the interactive interface displayed on the screen of the terminal device. For another example, a manner of operating the information apparatus, such as voice control or gesture control, can be pre-defined. In a case where the manner of operating the information apparatus is configured as voice control, after the user selects the information apparatus, the terminal device detects voice input and performs voice recognition, converts received voice into an operation instruction, and sends a control instruction to the information apparatus over a network for operation. When the manner of operating the information apparatus is configured as gesture control, a gesture of the user may be captured through the imaging means of the terminal device or a shooting means mounted in the user's surroundings, and the gesture may be recognized on the terminal device and converted into a corresponding operation instruction, and the operation instruction may be sent over the network to control the relevant information apparatus. A gesture associated with the operation of each information apparatus may be pre-defined. For example, a gesture associated with the operation of a lamp may include spreading a palm indicating turning on the lamp, making a first indicating turning off the lamp, swiping a finger up indicating increasing the brightness, and swiping a finger down indicating decreasing the brightness.

Figure 4:
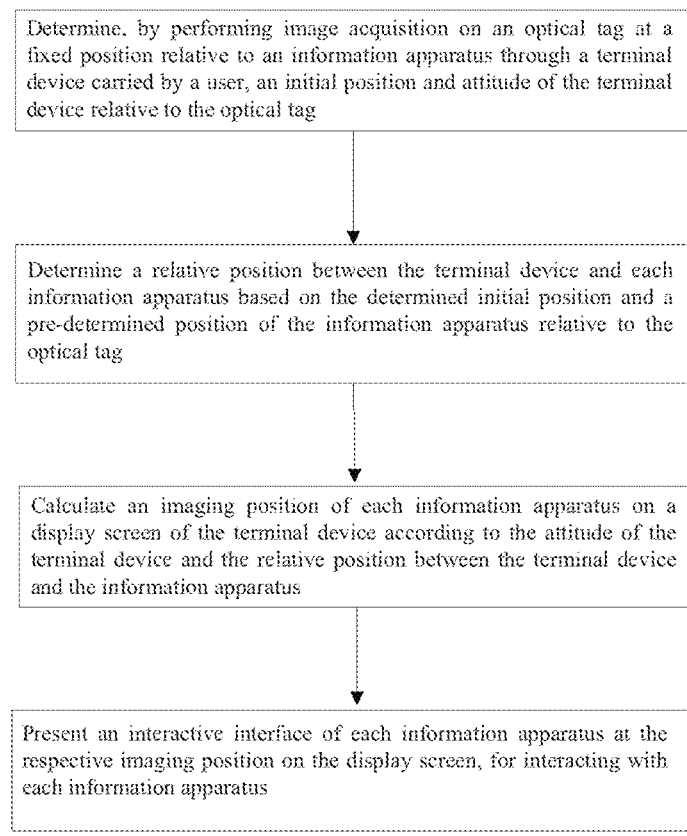
FIG. 4 is a flowchart of a method for interacting with an information apparatus based an optical tag, according to an embodiment of the present disclosure.

FIG. 4 is a flowchart of a method for interacting with an information apparatus by using an optical tag according to an embodiment of the present disclosure. In step S1), by performing image acquisition on an optical tag located in a fixed position relative to the information apparatus through a terminal device carried by a user, an initial position and attitude of the terminal device relative to the optical tag are determined. For example, by using the reverse positioning methods introduced above, an initial relative position relationship between an imaging means for image acquisition and an optical tag may be acquired by performing image acquisition on the optical tag, so as to determine an initial position and initial orientation of the terminal device. In step S2), a relative position between the terminal device and each information apparatus is determined based on the initial position of the terminal device and the pre-determined position of the information apparatus relative to the optical tag as mentioned above. Then, in step S3), an imaging position of each information apparatus on a display screen is determined. As introduced above in combination with the reverse positioning method and the formulas (1)-(3), the physical position of the optical tag and the relative position between the optical tag and each information apparatus are preset, in the process of determining the specific position and attitude of the imaging device relative to the optical tag according to the image of the optical tag acquired by the imaging means and the information related to the optical tag acquired from the server, the rotation matrix R, the displacement vector t and the internal parameters of the imaging device in the formula (3) have been determined, and thus image plane coordinates of each information apparatus can be determined according to the formula. Therefore, object coordinates of each information apparatus in the physical world coordinate system can be determined according to the relative position between the optical tag and the information apparatus, and image plane coordinates of the information apparatus in the imaging plane can be obtained by substituting the object coordinates into the formula (3). Then, in step S4), an interactive interface of each information apparatus may be superimposed in the respective imaging position on the display screen, for interacting with the respective information apparatus.

In another embodiment, if an information apparatus the user wants to control is not in the current display screen, the user may move the terminal device from the initial position to enable the information apparatus to appear on the display screen. For example, the user may translate or rotate the terminal device so that its camera finally faces the information apparatus. When the terminal device moves from the initial position, the change in the position and attitude of the terminal device may be detected, so as to determine position information and attitude information of the terminal device after the movement. Based on the position information and the attitude information, it is possible to determine which information apparatus may currently appear on the display screen of the terminal device and their respective presentation positions. Then, interactive interfaces of these information apparatus can be superimposed on the respective imaging positions of the information apparatus on the display screen to implement WYSIWYG interactive operations for the respective information apparatus. The terminal device may monitor changes in its own position and attitude in a variety of manners. For example, the terminal device may compare an image currently captured by the imaging means with a previous image by taking the optical tag as a reference point and identify differences in the images, so as to form feature points, and the feature points are used to calculate changes in the its own position and attitude. For another example, a terminal device such as a mobile phone can estimate changes in position and orientation of its camera in the real world over time according to values measured by a built-in inertial measurement sensor such as an accelerometer or a gyroscope. Then, the rotation matrix R and the displacement vector t are adjusted based on the current position and orientation of the terminal device, and the current image plane coordinates of the information apparatus are re-acquired to present a relevant icon or interface on the screen.

In another embodiment, the method may further include identifying the user's operation on the interactive interface of the information apparatus, converting the operation into a corresponding operation instruction, and sending the operation instruction to the information apparatus over a network. The information apparatus may perform a corresponding operation in response to the received operation instruction. The user may interact with the information apparatus in a variety of manners. For example, the user may configure and operate the information apparatus through the interactive interface displayed on the screen of the terminal device, such as by using touch screen input or keyboard input. For another example, a manner of operating the information apparatus, such as voice control or gesture control, can be pre-defined. In a case where the manner of operating the information apparatus is configured as voice control, after the user selects the information apparatus, the terminal device detects voice input and performs voice recognition, converts received voice into an operation instruction, and sends a control instruction to the information apparatus over a network for operation. When the manner of operating the information apparatus is configured as gesture control, a gesture of the user may be captured through the imaging means of the terminal device or a shooting means mounted in the user's surroundings, and the gesture may be recognized on the terminal device and converted into a corresponding operation instruction, and the operation instruction can be sent over the network to control the relevant information apparatus. A gesture associated with the operation of each information apparatus may be pre-defined. For example, a gesture associated with the operation of a lamp may include spreading a palm indicating turning on the lamp, making a first indicating turning off the lamp, swiping a finger up indicating increasing the brightness, and swiping a finger down indicating decreasing the brightness.

In the embodiments of the present disclosure, any optical tag (or light source) capable of transmitting information may be used. For example, the method in the present disclosure can be applied to light sources transmitting information through different stripes based on a CMOS rolling shutter effect (for example, the optical communication device described in Chinese Patent Publication CN104168060A), applied to, for example, the optical tag described in the Patent CN105740936A, applied to various optical tags that can identify transmitted information through a CCD photosensitive device, or applied to an optical tag (or light source) array.

References herein to "respective embodiments", "some embodiments", "one embodiment", or "embodiments", etc., refer to inclusion of a particular feature, structure, or property described in combination with the embodiment in at least one embodiment. Therefore, the occurrence of the phrase "in respective embodiments", "in some embodiments", "in one embodiment", or "in embodiments" throughout the text does not necessarily refer to the same embodiment. In addition, a particular feature, structure, or property may be combined in any appropriate manner in one or more embodiments. Therefore, a particular feature, structure, or property shown or described in one embodiment may be combined in whole or in part with features, structure, or properties of one or more other embodiments without limit, provided that the combination is not illogical or does not work. Expressions such as "according to A" or "based on A" appearing herein means being non-exclusive, that is, "according to A" may cover "only according to A" or "according to A and B" unless specifically stated or clearly understood in context to mean "only according to A". In the present disclosure, in order to be clear, some schematic operation steps are described in a certain order. However, it should be understood that some steps can be omitted or replaced by other steps. These steps do not have to be executed sequentially as shown; instead, some of these steps can be executed in a different order or in parallel according to actual needs, provided that new execution is not illogical or does not work.

Although the present disclosure has been described through certain embodiments, the present disclosure is not limited to the embodiments described herein, and may also include various changes and variations made without departing from the scope of the present disclosure.

What is claimed is:

1. A method for a terminal device to interact with one or more information apparatuses by using a single optical tag, comprising:
   determining, by performing image acquisition on the single optical tag through the terminal device carried by a user, a position and an attitude of the terminal device relative to the single optical tag by calculating a rotation matrix and a displacement vector based on geographic position information of the single optical tag, wherein each information apparatus is located at a predetermined position relative to the single optical tag;
   for each information apparatus:
   determining a relative position between the terminal device and the information apparatus based on the position of the terminal device relative to the single optical tag and the predetermined position of the information apparatus relative to the single optical tag;
   determining that, at the determined attitude of the terminal device and the relative position between the terminal device and the information apparatus, the information apparatus is at an imaging position that appears on a display screen of the terminal device;
   calculating the imaging position of the information apparatus on the display screen of the terminal device, according to the determined attitude of the terminal device and the relative position between the terminal device and the information apparatus; and
   presenting an interactive interface of the information apparatus at the respective imaging position on the display screen, for the user to interactively control the respective information apparatus over a network by interacting with the interactive interface.

2. The method of claim 1, wherein the single optical tag emits different lights to transmit different information, wherein performing the image acquisition comprises receiving the different lights.

3. The method of claim 1, further comprising adjusting the imaging position of each information apparatus on the display screen of the terminal device in response to a change in the position or attitude of the terminal device.

4. The method of claim 3, further comprising identifying the change in the position or attitude of the terminal device by using a measurement sensor of the terminal device.

5. The method of claim 1, further comprising:
   identifying a user operation on the interactive interface of the information apparatus; and
   converting the identified user operation into a corresponding operation instruction, and sending the operation instruction to the information apparatus over the network for interactively controlling the information apparatus.

6. The method of claim 5, wherein the user operation on the interactive interface of the information apparatus comprises at least one of the following: a screen input, a keyboard input, a voice input or a gesture input.

7. A system for a terminal device to interact with one or more information apparatuses by using a single optical tag, comprising:
   the one or more information apparatuses;
   the single optical tag at a fixed position relative to the one or more information apparatuses;
   a server for storing information related to the one or more information apparatuses and the single optical tag; and
   the terminal device equipped with an imaging means, wherein the terminal device is configured to:
   perform image acquisition on the single optical tag to determine a position and an attitude of the terminal device relative to the single optical tag by calculating a rotation matrix and a displacement vector based on geographic position information of the single optical tag;
   for each information apparatus:
   determine a relative position between the terminal device and the information apparatus based on the position of the terminal device and a predetermined position of the information apparatus relative to the single optical tag acquired from the server;
   determine that, at the determined attitude of the terminal device and the relative position between the terminal device and the information apparatus, the information apparatus is at an imaging position that appears on a display screen of the terminal device;
   calculate the imaging position of the information apparatus on the display screen of the terminal device, according to the determined attitude of the terminal device and the relative position between the terminal device and the information apparatus; and
   present an interactive interface of the information apparatus at the respective imaging position on the display screen, for the user to interactively control the respective information apparatus over a network by interacting with the interactive interface.

8. The system of claim 7, wherein the single optical tag comprises a light source and a controller, wherein the controller is configured to control different lights emitted by the light source to transmit different information.

9. The system of claim 7, wherein the terminal device is further configured to adjust the imaging position of each information apparatus on the display screen of the terminal device in response to a change in the position or attitude of the terminal device.

10. The system of claim 9, wherein the terminal device comprises a measurement sensor configured to identify the change in the position or attitude of the terminal device.

11. The system of claim 7, wherein the terminal device is further configured to:
identify a user operation on the interactive interface of the information apparatus; and
convert the identified user operation into a corresponding operation instruction, and send the operation instruction to the information apparatus over the network for interactively controlling the information apparatus.

12. The system of claim 11, wherein the user operation on the interactive interface of the information apparatus comprises at least one of the following: a screen input, a keyboard input, a voice input or a gesture input.

13. A non-transitory computer-readable storage medium storing a computer program which, when executed, implements a method for a terminal device to interact with one or more information apparatuses by using a single optical tag, the method comprising:
determining, by performing image acquisition on the single optical tag through the terminal device carried by a user, a position and an attitude of the terminal device relative to the single optical tag by calculating a rotation matrix and a displacement vector based on geographic position information of the single optical tag, wherein each information apparatus is located at a predetermined position relative to the single optical tag;
for each information apparatus:
determining a relative position between the terminal device and the information apparatus based on the position of the terminal device relative to the single optical tag and the predetermined position of the information apparatus relative to the single optical tag;
determining that, at the determined attitude of the terminal device and the relative position between the terminal device and the information apparatus, the information apparatus is at an imaging position that appears on a display screen of the terminal device;
calculating the imaging position of the information apparatus on the display screen of the terminal device, according to the determined attitude of the terminal device and the relative position between the terminal device and the information apparatus; and
presenting an interactive interface of the information apparatus at the respective imaging position on the display screen, for the user to interactively control the respective information apparatus over a network by interacting with the interactive interface.

14. The non-transitory computer-readable storage medium of claim 13, wherein the single optical tag emits different lights to transmit different information, wherein performing the image acquisition comprises receiving the different lights.

15. The non-transitory computer-readable storage medium of claim 13, wherein the method further comprises adjusting the imaging position of each information apparatus on the display screen of the terminal device in response to a change in the position or attitude of the terminal device.

16. The non-transitory computer-readable storage medium of claim 15, wherein the method further comprises identifying the change in the position or attitude of the terminal device using a measurement sensor of the terminal device.

17. The non-transitory computer-readable storage medium of claim 13, wherein the method further comprises:
identifying a user operation on the interactive interface of the information apparatus; and
converting the identified user operation into a corresponding operation instruction, and sending the operation instruction to the information apparatus over the network for interactively controlling the information apparatus.

18. The non-transitory computer-readable storage medium of claim 17, wherein the user operation on the interactive interface of the information apparatus comprises at least one of a screen input, a keyboard input, a voice input or a gesture input.

* * * * *